(12) United States Patent
Marshman et al.

(10) Patent No.: US 7,743,680 B1
(45) Date of Patent: Jun. 29, 2010

(54) INTERNALLY ARTICULATED PARKING BRAKE ASSEMBLY FOR AUTOMOTIVE VEHICLE

(75) Inventors: David Marshman, Canton, MI (US);
Michael Whitens, Novi, MI (US);
Jeffrey Singer, Canton, MI (US);
Michael Samluk, New Hudson, MI (US); Peter Bejin, Northville, MI (US);
Tuan-Anh Nguyen, Birmingham, MI (US)

(73) Assignee: Ford Global Technologies, Dearborn, MI (US)

( * ) Notice: Subject to any disclaimer, the term of this patent is extended or adjusted under 35 U.S.C. 154(b) by 1284 days.

(21) Appl. No.: 11/162,777

(22) Filed: Sep. 22, 2005

(51) Int. Cl.
*G05G 9/00* (2006.01)
(52) U.S. Cl. ...................................... 74/478
(58) Field of Classification Search ............. 74/473.3, 74/478, 490.12, 490.14, 500.5, 512, 519, 74/527, 529, 532, 533, 577 R
See application file for complete search history.

(56) References Cited

U.S. PATENT DOCUMENTS

| | | | |
|---|---|---|---|
| 3,273,418 A | | 9/1966 | Ellis |
| 3,643,525 A | | 2/1972 | Gibas |
| 4,005,617 A | * | 2/1977 | Sourbel et al. ................. 74/516 |
| 4,441,380 A | * | 4/1984 | Kawaguchi et al. ........... 74/512 |
| 4,597,307 A | | 7/1986 | Kawaguchi et al. |
| 5,916,330 A | * | 6/1999 | Jacobson ...................... 74/512 |
| 6,520,045 B2 | * | 2/2003 | Fukase et al. ................. 74/512 |
| 6,592,495 B2 | * | 7/2003 | Jeon ............................ 477/197 |
| 6,722,225 B1 | * | 4/2004 | Martinovsky ................ 74/512 |

FOREIGN PATENT DOCUMENTS

GB  838965  6/1960

* cited by examiner

*Primary Examiner*—Vicky A Johnson
(74) *Attorney, Agent, or Firm*—Jerome R. Drouillard; Fredrick Owens

(57) ABSTRACT

A parking brake system for an automotive vehicle includes an internally articulated pedal arm having an upper pedal arm which is connected with a cable operated parking brake actuator, and a lower pedal arm which is pivotably attached to the upper pedal arm such that the lower pedal arm has both a stowed position and a deployed position.

17 Claims, 3 Drawing Sheets

INTERNALLY ARTICULATED PARKING BRAKE ASSEMBLY FOR AUTOMOTIVE VEHICLE

TECHNICAL FIELD

The present invention relates to a fold-away parking brake assembly for use with an automotive vehicle.

BACKGROUND

Most automotive vehicles have a service brake system applied by means of a foot pedal. Such service brakes were actuated mechanically on early model vehicles. At the current time, however, service brakes are most often applied by means of hydraulic, electro-hydraulic, or air power. Parking brakes, on the other hand, are typically mechanically applied via a lever. In early vehicles, such levers were extremely long devices designed to be grasped by the driver and pulled back to set the parking brake.

In many vehicles produced today, a parking brake lever is mounted in a center console between two front seating positions of the vehicle, such that the vehicle driver is able to pull up on the lever to set the parking brake. Unfortunately, this arrangement demands a great deal of space in the vehicle's center console, which space could otherwise be devoted to more productive uses. Although a foot pedal actuator will save precious space within the vehicle's center console, a special problem arises in the context of smaller vehicles, because although it is possible to mount a parking brake with a foot pedal, say to the cowlside panel located to the driver's extreme left, it is sometimes not possible to mount the pedal while providing adequate clearance for the driver's outboard leg. An internally articulated parking brake pedal according to the present invention solves the problem of packaging a foot-operated parking brake, which by definition is not mounted within the center console of the vehicle, thereby providing additional space for other uses within the vehicle.

SUMMARY

A parking brake system for an automotive vehicle includes a pivotably mounted upper pedal arm having a first position in which the parking brake is applied and a second position in which the parking brake is released. A cable operated parking brake actuator is operatively connected with the upper pedal arm such that rotation of the upper pedal arm from the second position to the first position will cause the parking brake to be applied. A lower pedal arm is pivotably attached to the upper pedal arm, with the lower pedal arm having a stowed position with respect to the upper pedal arm and a deployed position with respect to the upper pedal arm. The stowed position of the lower pedal arm is characterized by pivotal, lateral repositioning of the lower pedal arm with respect to the upper pedal arm. Alternatively, the stowed position of the lower pedal arm may be characterized by pivotal, vertical repositioning of the lower pedal arm with respect to the upper pedal arm. In line with conventional practice, the present pedal arm carries a foot-engageable pedal pad which may be contoured according to the type of pivotal motion of the lower pedal arm with respect to the upper pedal arm.

Movement of the lower pedal arm from the deployed position to the stowed position is resiliently assisted. Movement of the lower pedal arm from the stowed position to the deployed position may also be resiliently assisted. Movement to the stowed position may also be accomplished by means of a cable driven by the vehicle's parking brake actuator.

In an embodiment of the present invention wherein the stowed position of the lower pedal arm is characterized by rotational and lateral repositioning of the lower pedal arm, the lower pedal arm will rotate with respect to the upper arm about a longitudinally extending pivot axis. On the other hand, when the stowed position of the lower pedal arm is characterized by vertically repositioning of the lower pedal arm, the lower pedal arm will rotate with respect to the upper pedal arm about a laterally extending pivot axis. These axes correspond to the longitudinal and lateral axes of a vehicle within which the present system is installed.

According to another aspect of the present invention, a method for applying a parking brake of an automotive vehicle having a pivotably mounted, internally articulated pedal arm operatively connected with a cable operated parking brake actuator includes the steps of: rotating a pivotably mounted parking brake lower pedal arm from a stowed position with respect to an upper pedal arm to a deployed position with respect to the upper arm, and depressing the lower pedal arm to cause the upper pedal arm and the cable operated parking brake actuator to apply the parking brake. The deployed position of the lower pedal arm is characterized by establishment of an abutting contact between the upper pedal arm and the lower pedal arm.

It is a first advantage of a system according to the present invention that packaging of a pedal-operated parking brake assembly is facilitated, particularly with the smaller passenger compartments found in compact and sub-compact vehicles.

It is a further advantage of the present invention that a pedal-operated parking brake may be used while at the same time providing sufficient legroom for the vehicle's driver.

It is a further advantage of the present invention that relocation of a parking brake lever from a center console to a position upon a cowlside will provide additional space for other uses within the center console.

Other advantages, as well as objects and features of the present invention, will become apparent to the reader of this specification.

BRIEF DESCRIPTION OF THE DRAWINGS

In the following figures the same reference numerals will be used to illustrate the same components. Although the figures illustrate a left hand drive vehicle, the present invention is equally applicable to right hand drive vehicles.

DETAILED DESCRIPTION OF THE PREFERRED EMBODIMENTS

Figure 1:
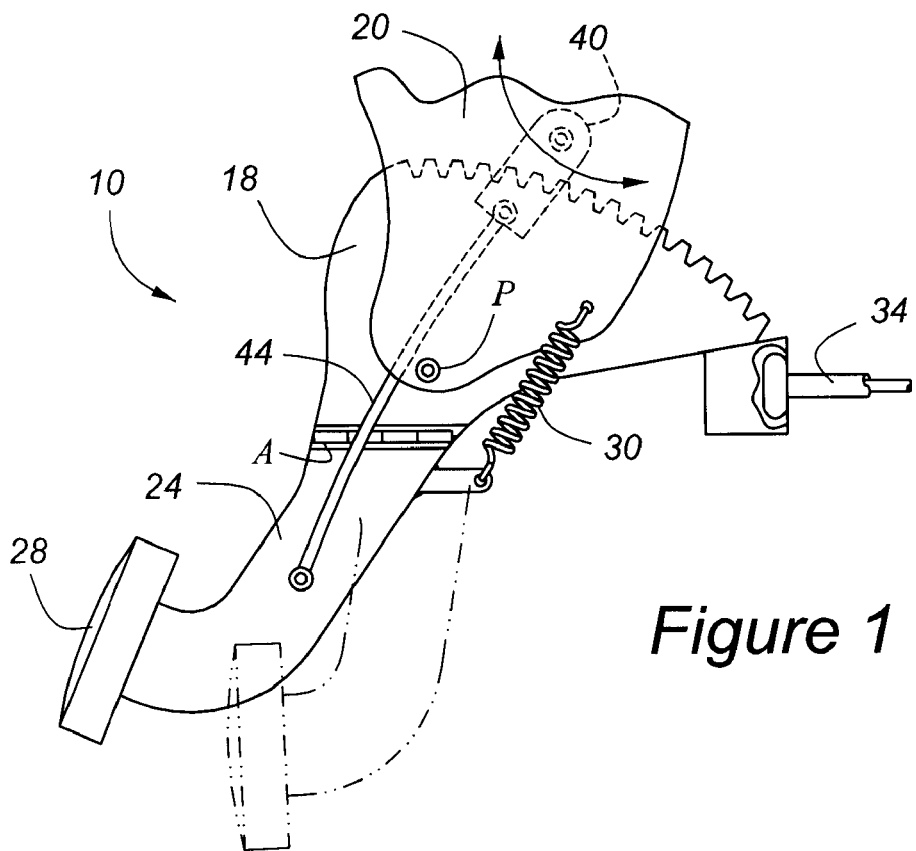
FIG. 1 is a side elevation of a first embodiment of a parking brake assembly according to the present invention.

As shown in FIG. 1, pedal assembly 10 includes upper pedal arm 18, which is pivoted to pedal mounting bracket 20 about pivot axis P.

Figure 2:
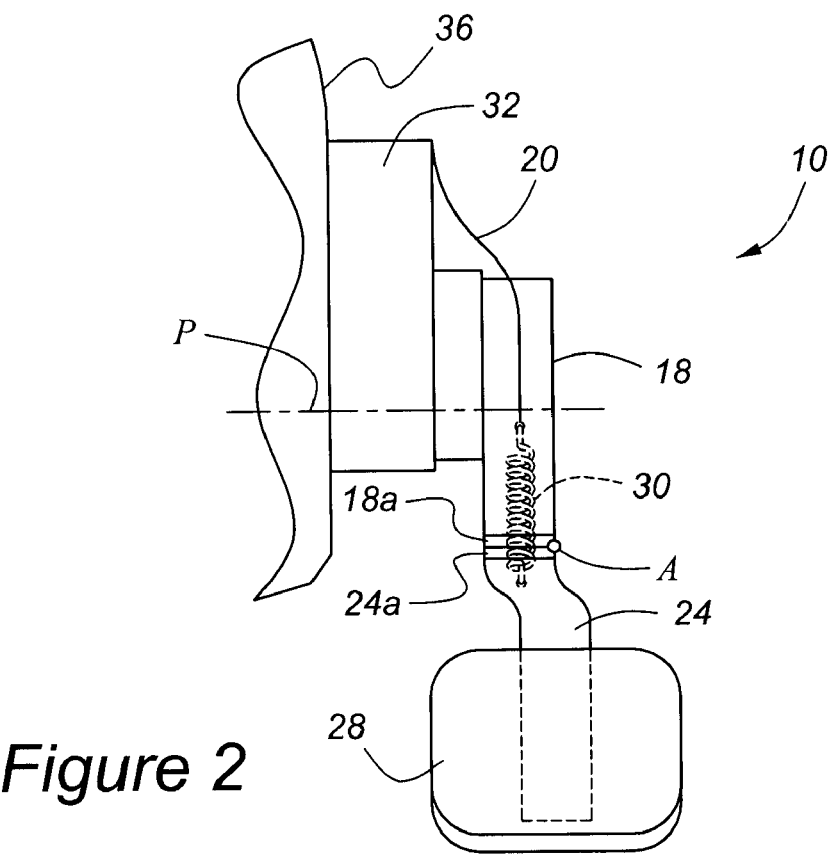
FIG. 2 is a front elevation of the parking brake assembly of FIG. 1, illustrating a lower pedal arm in a deployed position.
Figure 3:
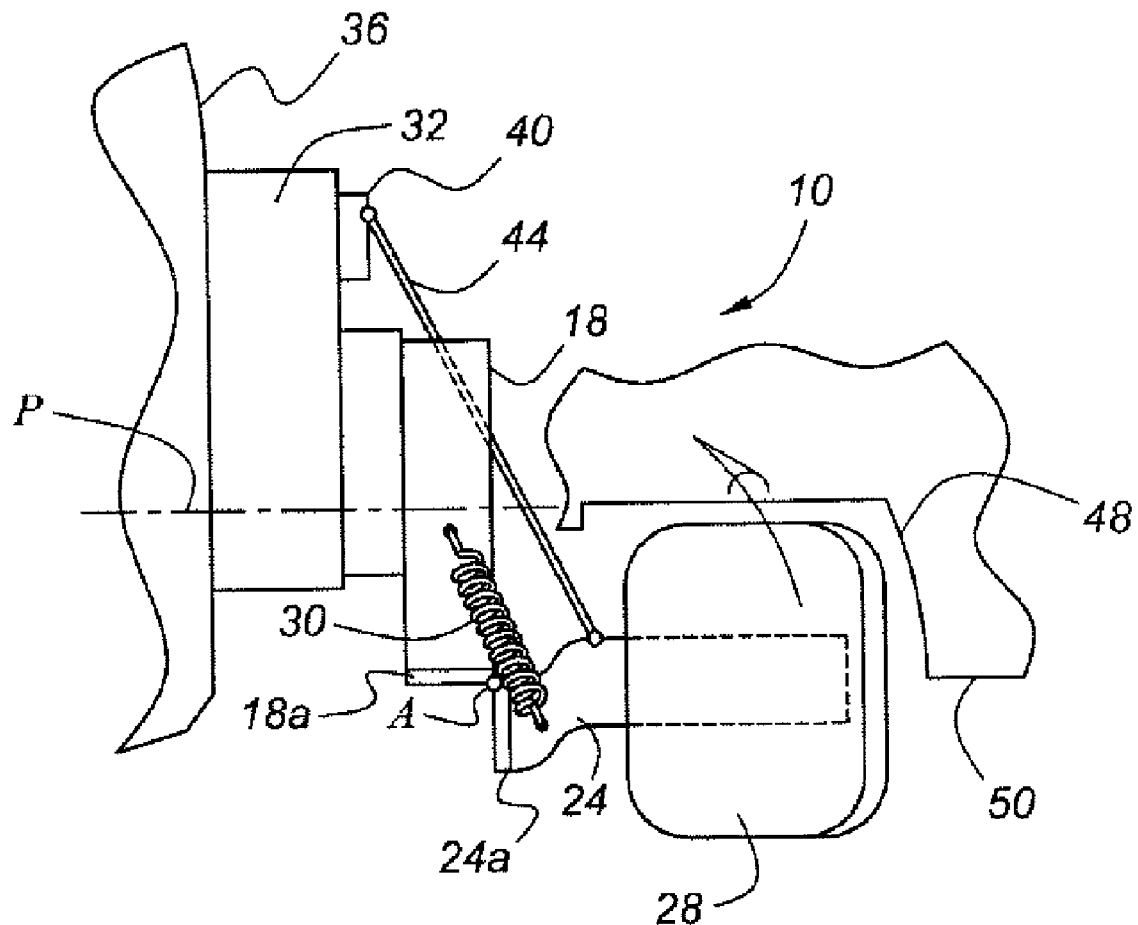
FIG. 3 is similar to FIG. 2, but shows the lower pedal arm in a stowed position.

As shown in FIGS. 2 and 3, bracket 20 is mounted to parking brake actuator 32, which is in turn mounted to a vehicle structure such as the illustrated cowlside 36.

Upper pedal arm 18 has a first position shown as a ghost view in FIG. 1, in which the vehicle's parking brake (not shown) is applied, and a second position, shown in solid lines in FIG. 1, in which parking brake is released. The application and release of the parking brake is accomplished by means of cable 34 which is attached to upper pedal arm 18. Those skilled in the art will appreciate in view of this disclosure that a variety of mechanisms may be used to achieve ratcheting detention of upper pedal arm 18; such details are committed to those utilizing the present invention.

FIG. 1 also shows lower pedal arm 24 including pedal pad 28, which is mounted upon upper pedal arm 18 for rotation about axis A. The present system is internally articulated because the pedal arm itself includes a hinged joint.

FIG. 2 shows lower pedal arm 24 in its deployed position. Spring 30 is used to resiliently bias pedal 24 into either the deployed position (FIG. 2) or the stowed position shown in FIG. 3. Thus, spring 30 is an over-center device which maintains lower pedal arm 24 in the position to which it has been placed either by the vehicle operator in the case of deployment of lower pedal arm 24, or the stowed placement by parking brake actuator 32 via articulation lever 40 and articulation cable 24 (FIGS. 1 and 3).

FIGS. 2 and 3 show the manner in which pivot axis A provides a swiveling mounting for lower pedal arm 24. When lower pedal arm 24 is in the deployed position shown in FIG. 2, the precise rotational position of lower arm 24 with respect to upper arm 18 is determined by abutments 18a and 24a (FIG. 2).

When the parking brake is released by the vehicle's driver, parking brake actuator 32 rotates articulation lever 40, which pulls articulation cable 44, so as to cause lower pedal arm 24 to rotate in a counter clockwise direction. This has the effect of producing both a rotational and lateral repositioning of lower pedal arm 24.

In order to assist the vehicle operator in moving lower pedal arm 24 from its stowed position shown in FIG. 3 to its deployed position shown in FIG. 2, a scalloped clearance area 48 (FIG. 3) is provided in lower instrument panel 50. Thus, only a small positioning input from the driver's left foot is all that is required to move lower pedal arm 24 from the position of FIG. 3 to that of FIG. 2. Note, too, from FIG. 3, that spring 30 maintains lower pedal arm 24 in its stowed position once it has been moved to that position by means of articulation lever 40 and articulation cable 44. Alternatively, spring 30 could be used without cable 44 to move lower pedal arm 24 to its stowed position in response to a slight input from the vehicle's driver, in the form of a push of lower pedal arm 24 to the driver's right.

Figure 4:
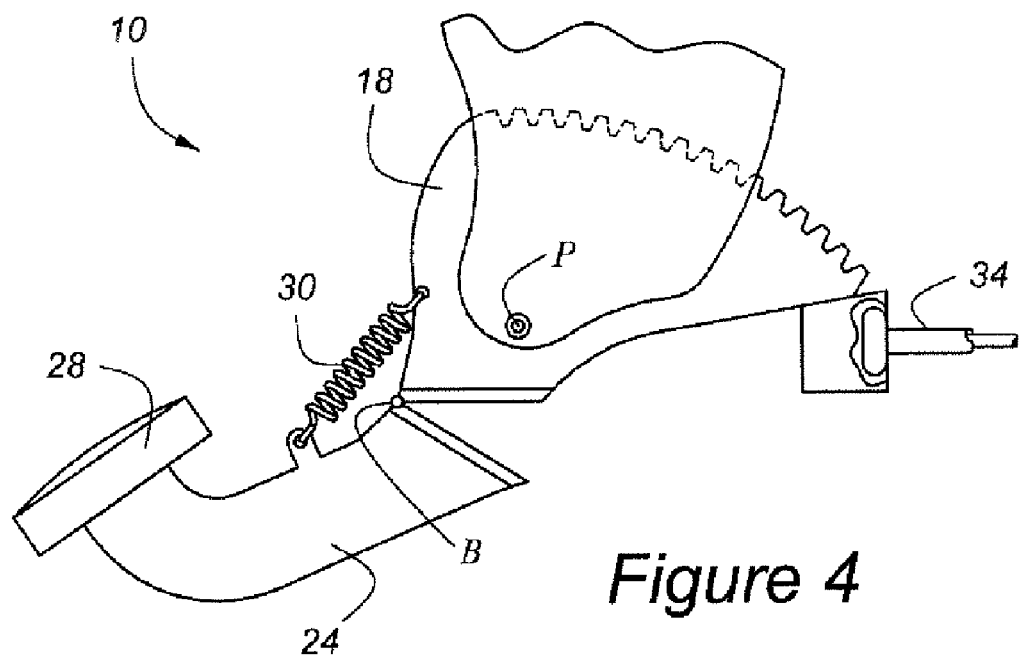
FIG. 4 illustrates a second embodiment in which the lower pedal arm is articulated with respect to the upper pedal arm about a laterally extending pivot axis. The lower pedal arm is shown in its stowed position.
Figure 5:
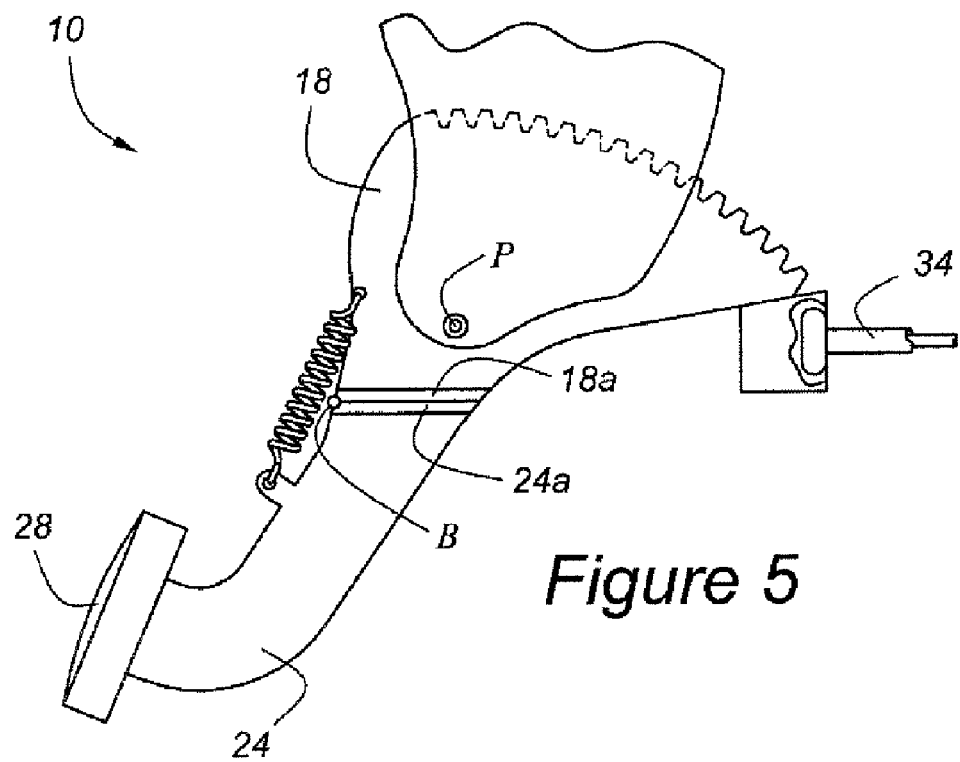
FIG. 5 shows the lower pedal arm of FIG. 4 in its deployed position.

With the embodiment of FIGS. 4 and 5, pivot axis B, which extends laterally of the vehicle, is used instead of longitudinally extending pivot axis A. FIG. 4 shows lower pedal arm 24 in its stowed position which is caused by the resilient urging of tension spring 30, which is mounted between pedal mounting bracket 20 and lower pedal arm 24. When the vehicle's driver depresses pedal pad 28, lower pedal arm 24 rotates about pivot axis B and comes into abutting contact with upper pedal arm 18. Thus, abutment 24a touches abutment 18a, preventing further rotation of lower pedal arm 24 with respect to upper pedal arm 18. In the embodiment of FIGS. 4 and 5, the portion of pedal pad 28 which contacts the driver's foot may be contoured with more convexity, so as to promote ease of using the internal articulation described herein.

According to another aspect of the present invention, a method for applying a parking brake of an automotive vehicle having a pivotably mounted, internally articulated pedal arm operatively connected with a cable operated parking brake actuator includes the steps of rotating a pivotably mounted lower brake pedal arm 24 from one of the alternative stowed positions shown in FIGS. 3 and 4 to the deployed position shown in FIGS. 2 and 5. Then, the lower pedal arm is depressed to cause the upper pedal arm and the cable operated parking brake actuator to apply the parking brake. Utilization of the lower pedal arm to apply the parking brake is possible because the deployed position of the lower pedal arm is characterized by the establishment of abutting contact between the upper pedal arm and the lower pedal arm. This permits the upper pedal arm to transmit torque imposed by the lower pedal arm.

While particular embodiments of the invention have been shown and described, numerous variations and alternate embodiments will occur to those skilled in the art. Accordingly, it is intended that the invention be limited only in terms of the appended claims.

What is claimed is:

1. A parking brake system for an automotive vehicle, comprising:
    a pivotably mounted upper pedal arm having a first position in which a parking brake is applied and a second position in which the parking brake is released;
    a cable operated parking brake actuator operatively connected with said upper pedal arm such that rotation of the upper pedal arm from said second position to said first position will cause the parking brake to be applied by a brake cable (34); and
    a lower pedal arm pivotably attached to said upper pedal arm, with said lower pedal arm having a stowed position with respect to the upper pedal arm and a deployed position with respect to the upper arm.

2. A parking brake system according to claim 1, wherein said stowed position of said lower pedal arm is characterized by lateral repositioning of the lower pedal arm with respect to the upper pedal arm.

3. A parking brake system according to claim 1, wherein said stowed position of said lower pedal arm is characterized by vertical repositioning of the lower pedal arm with respect to the upper pedal arm.

4. A parking brake system according to claim 1, wherein said lower pedal arm carries a foot-engageable pedal pad.

5. A parking brake system according to claim 1, wherein movement of the lower pedal arm from the deployed position to the stowed position is resiliently assisted.

6. A parking brake system according to claim 1, wherein movement of the lower pedal arm from the stowed position to the deployed position and from the deployed position to the stowed position is resiliently assisted.

7. A parking brake system according to claim 1, wherein the lower pedal arm is moved from the deployed position to the stowed position by means of an articulation cable driven by the parking brake actuator.

8. A parking brake system according to claim 1, wherein the lower pedal arm is moved from the deployed position to the stowed position by means of an articulation cable driven by the parking brake actuator and by a resilient element mounted between the upper pedal arm and the lower pedal arm.

9. A parking brake system according to claim 8, wherein said resilient element comprises a tension spring.

10. A parking brake system according to claim 1, wherein said stowed position of said lower pedal arm is characterized by lateral repositioning of the lower pedal arm, as a result of rotation of the lower arm with respect to said upper pedal arm about a longitudinally extending pivot axis.

11. A parking brake system according to claim 1, wherein said stowed position of said lower pedal arm is characterized by vertical repositioning of the lower pedal arm, as a result of rotation of the lower arm with respect to the upper arm about a laterally extending pivot axis.

12. A method for applying an articulated parking brake of an automotive vehicle having a pivotably mounted upper pedal arm operatively connected with a cable operated parking brake actuator, comprising the steps of:

rotating a pivotably mounted parking brake lower pedal arm from a stowed position with respect to an upper pedal arm to a deployed position with respect to the upper arm; and depressing the deployed lower pedal arm to cause the upper pedal arm and the cable operated parking brake actuator to apply the parking brake.

13. A method according to claim 12, wherein the deployed position of said lower pedal arm is characterized by the establishment of abutting contact between the upper pedal arm and the lower pedal arm.

14. A parking brake system for an automotive vehicle, comprising:

a cable operated parking brake actuator;

a pivotably mounted, internally articulated pedal arm operatively connected with said parking brake actuator such that rotation of the pedal arm from a second position to a first position will cause the parking brake actuator to apply a parking brake, with said pedal arm comprising: an upper pedal arm pivotably mounted to a vehicle structure; and a lower pedal arm pivotably attached to said upper pedal arm, with said lower pedal arm having a stowed position with respect to the upper pedal arm and a deployed position with respect to the upper arm, with said lower pedal arm being positionable by the driver of the vehicle.

15. A parking brake system according to claim 14, further comprising a resilient member for urging the lower pedal arm to move from said deployed position to said stowed position.

16. A parking brake system according to claim 14, wherein the lower pedal arm is moved from its deployed position to its stowed position by means of an articulation cable driven by the parking brake actuator and by a resilient element mounted between the upper pedal arm and the lower pedal arm.

17. A parking brake system according to claim 14, further comprising a resilient member for urging the lower pedal arm to move from said deployed position to said stowed position, with said resilient member also urging the lower pedal arm to move from its deployed position to its stowed position, with movement of said lower pedal arm being responsive to the vehicle's driver.

* * * * *